(12) United States Patent
Brooks

(10) Patent No.: US 7,849,040 B2
(45) Date of Patent: Dec. 7, 2010

(54) METHOD FOR USING ISOMETRIES ON THE SPACE OF SIGNATURES TO FIND SIMILAR SETS OF DATA

(76) Inventor: Roger K. Brooks, 690 Wildwood La., Palo Alto, CA (US) 94303

( * ) Notice: Subject to any disclaimer, the term of this patent is extended or adjusted under 35 U.S.C. 154(b) by 589 days.

(21) Appl. No.: 11/941,958

(22) Filed: Nov. 18, 2007

(65) Prior Publication Data

US 2008/0215567 A1    Sep. 4, 2008

Related U.S. Application Data

(60) Provisional application No. 60/883,001, filed on Dec. 31, 2006, provisional application No. 60/882,838, filed on Dec. 29, 2006.

(51) Int. Cl.
*G06F 17/00*    (2006.01)
(52) U.S. Cl. ........................................ 706/45
(58) Field of Classification Search ............. 706/45–46, 706/62; 707/692, 758, 749; 708/201
See application file for complete search history.

(56) References Cited

U.S. PATENT DOCUMENTS

| | | | | |
|---|---|---|---|---|
| 5,442,716 A | * | 8/1995 | Otsu et al. ................... 382/181 |
| 5,933,823 A | * | 8/1999 | Cullen et al. ........................ 1/1 |
| 5,956,404 A | * | 9/1999 | Schneier et al. ............. 713/180 |
| 6,096,961 A | * | 8/2000 | Bruti et al. ..................... 84/609 |
| 7,031,980 B2 | * | 4/2006 | Logan et al. ........................ 1/1 |
| 7,725,724 B2 | * | 5/2010 | Ding et al. ................... 713/176 |
| 2007/0198459 A1 | * | 8/2007 | Boone et al. .................... 707/1 |
| 2008/0140741 A1 | * | 6/2008 | Brooks ........................ 708/201 |
| 2008/0162421 A1 | * | 7/2008 | Brooks ........................... 707/2 |
| 2008/0162422 A1 | * | 7/2008 | Brooks ........................... 707/2 |
| 2008/0215529 A1 | * | 9/2008 | Brooks ........................... 707/2 |
| 2008/0215530 A1 | * | 9/2008 | Brooks ........................... 707/2 |
| 2008/0215566 A1 | * | 9/2008 | Brooks ........................... 707/5 |

* cited by examiner

*Primary Examiner*—David R Vincent

(57) ABSTRACT

A method for finding sets of data (SDDs) which are similar to a target SDD, is invented. By virtue of the isometrics on the space of equivalence signatures the lengths of the equivalence signature vectors of similar SDDs must be equal. A filter is then applied to the database of SDDs to find those SDDs that have the same length of the equivalence signatures vectors as that of the target SDD. With this, a significant reduction in the number of SDDs to be compared with the target for a final determination of similarity is obtained. This is an improvement over the state of the art wherein the computational expensive process of performing a complete search against the entire corpus must be applied.

10 Claims, 2 Drawing Sheets

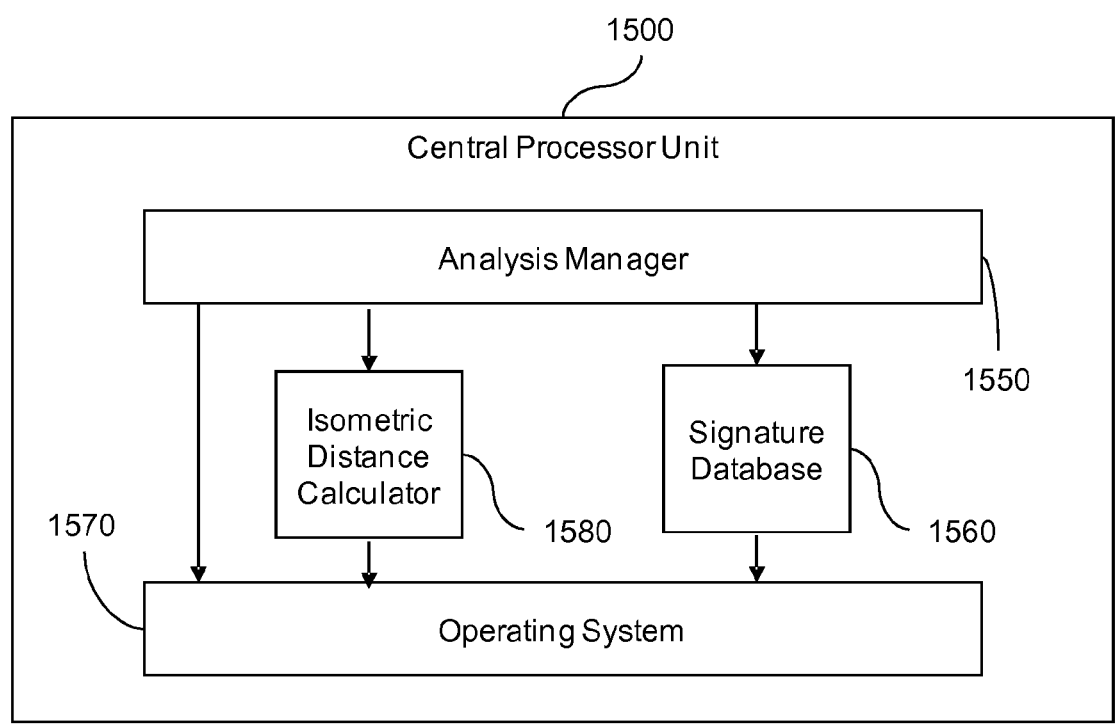

METHOD FOR USING ISOMETRIES ON THE SPACE OF SIGNATURES TO FIND SIMILAR SETS OF DATA

CROSS-REFERENCE TO RELATED APPLICATIONS

This application claims the benefit of PPA Ser. No. 60/883,001, filed Dec. 31, 2006 by the present inventor and PPA Ser. No. 60/882,838, filed Dec. 29, 2006 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

This invention relates to the identification and retrieval of digital data by a computing device.

2. Prior Art

A method for the computation finding similar sets of digital data (SDD), such as text, binaries, audio, images, graphics, video, and the like, that have been assigned equivalence signatures, is invented here. The determination of similarity leverages a metric, on the space of equivalence signatures, that manifests isometrics of the space of signatures. By design, similar sets of data will have the same lengths on the space of equivalence signatures.

The definition of "similarity", and thus the features and method used to compute it, is idiosyncratic to the retrieval application [O'Connor]. In the case of image retrieval [Gonzalez], methods using entropy, moments, etc. as signatures, have been invented [U.S. Pat. Nos. 5,933,823; 5,442,716]. Another invention [U.S. Pat. No. 7,246,314], uses closeness to a Gaussian model as a similarity measure for identifying similar videos. Methods for the assignment of signatures for all media types which change in a bounded manner when small alterations are made to a SDD have also been invented [Brooks]. The latter are also invariant to certain classes of transformations of the data, which are typical of the changes between similar sets of data, leading to equivalence classes of sets of data. Thus those signatures are referred to as "equivalence signatures".

The cost of implementing these methods is typically proportional to the product of the number of SDDs in the database with the cost of computing the distance between the target SDD and another SDD. The latter often [Raghavan] involves the computation of the projection angle between two vectors that represent the features (e.g., histogram of the text elements) of the SDDs. For large databases, this process can be both resource and time expensive. A two step method is required wherein, during the retrieval phase, definitely dissimilar SDDs are first weeded out thereby significantly reducing the number of candidates for similarity. This first step should be computationally inexpensive thus significantly reducing the resource requirements and latency in computing the results of the second step, the application of traditional features.

Intuitively, if two SDDs are similar, then they should be locally deformable into each other. For example, if two images are rescalings of each other, then they are similar. This invention leverages elementary results from the differential geometry of symmetric spaces [Helgason] to address this problem. In particular, we use the fact that the equivalence signatures change by diffeomorphisms when infinitesimal changes, that do not leave the equivalence signatures invariant, are made to the SDDs. A class of metrics for which these diffeomorphisms are isometries is used to compute the distance on the space of signatures.

We interpret each SDD as a sampling of maps from an n-dimensional space, N, with coordinates, $(\theta^1, \theta^2 \ldots, \theta^n)$ or collectively $\theta$, to an m-dimensional space, M, with coordinates $\sigma^A(\theta)$, for $A=1, \ldots, m$. Each $\sigma^A(\theta)$ is referred to as a plane; for example, images typically have three color planes of data, red, green and blue. If objects have been segmented from the SDD then the data for these objects are themselves SDDs.

For each SDD, a point on the space of equivalence signatures is computed. Each equivalence signature $\xi[\sigma]$, is a functional of the SDD. Consider an infinitesimal variation of a SDD, $$\sigma^A(\theta) \rightarrow \sigma^{1A}(\theta) = \sigma^A(\theta) + \epsilon \rho^A(\theta), \qquad \text{Eqn. 1}$$

where the $\sigma^{1A}$ are the planes of the SDD formed as result of the changes to the original SDD's planes $\sigma^A$, $\epsilon$ is an infinitesimal constant such that contributions of order $\epsilon^2$ can be neglected, and the $\rho^A(\theta)$ are functions which represent the changes to the original SDD at each point in the presentation space. Under these changes, the equivalence signatures transform into functions on the space of equivalence signatures, $$\xi^\alpha[\sigma + \epsilon] = \xi^\alpha[\sigma] + \epsilon f^\alpha(\xi[\sigma]), \qquad \text{Eqn. 2}$$

Here $\alpha$ is a label for the coordinates in the r-dimensional space of equivalence signatures, $\alpha = 1, \ldots r$. The $\epsilon^\alpha[\sigma]$ are points on the space of equivalence signatures. The vectors to those points from the origin of the latter space, are equivalence signature vectors.

As an example, take the equivalence signature for the dynamics of data in two-dimensional presentation spaces [Brooks] with (summation over repeated indices is implied)

width and height $L_1$ and $L_2$, respectively,
a configurable metric, $g_{ij}(\theta)$, on the presentation space,
g being the determinant of the metric $g_{ij}$
a configurable metric, $G_{AB}(\sigma)$, on the data space $$\partial_i = \frac{\partial}{\partial \theta^i}$$

an $i = 1, 2$ $$\epsilon[\sigma] = \int_0^{L_1} d\theta^1 \int_0^{L_2} d\theta^2 \sqrt{g} g^{ij} G_{AB}(\sigma) \partial_i \sigma^A \partial_j \sigma^B. \qquad \text{Eqn. 3}$$

Note that different choices for the metric, $G_{AB}$, lead to different equivalence signatures for the same SDD. Applying the change in Eqn. 1, this equivalence signature changes to an expression of the form given in Eqn. 2, with the function $f$ given by its argument, $f(\xi[\sigma]) = \xi[\sigma]$, but with a new metric on the data space as $G_{AB}(\sigma)$ is replaced by $$G_{AB}(\sigma) \rightarrow \frac{1}{2} \left[ \begin{array}{c} G_{AC}(\sigma) \partial_E \rho^C(\sigma) + G_{BC}(\sigma) \partial_A \rho^C(\sigma) + \\ \rho^C(\sigma) \partial_C G_{AB}(\sigma) \end{array} \right], \qquad \text{Eqn. 4}$$

where $\partial_A = \frac{\partial}{\partial \sigma^A(\theta)}$.

The transformation in Eqn. 2 is a diffeomorphism of the space of signatures. If we have a metric on the space of equivalence signatures that is preserved by such a diffeomorphism, then the distances of the points in that space that differ by Eqn. 1 will be the same. Distances in Euclidean space are preserved under the full set of isometries of the space. Thus SDDs, whose equivalence signatures are at points in the space of equivalence signatures that are equidistance from the origin of that space, are similar. Euclidean spaces are the best known example of maximally symmetric spaces. The metrics of, and hence distances on, maximally symmetric spaces are preserved under the full set of isometries of the space. Here we parameterize such metrics in terms a constant, K, and a constant r×r matrix $K_{\alpha\beta}$ as [Weinberg]

$$C_{\alpha\beta}(\xi[\sigma]) \equiv K_{\alpha\beta} + \frac{KK_{\gamma\alpha}\xi^\gamma[\sigma]K_{\delta\beta}\xi^\delta[\sigma]}{1 - KK_{\mu\tau}\xi^\mu[\sigma]\xi^\tau[\sigma]} \qquad \text{Eqn. 5}$$

For simplicity we will choose $K_{\alpha\beta} = \delta_{\alpha\beta}$ then the case K=0 yields Euclidean space. In terms of the metric $C_{\alpha\beta}$ the distance, in the space of equivalence signatures is $$D = \int d\tau \sqrt{C_{\alpha\beta}(\xi[\sigma]) \frac{d\xi^\alpha[\sigma]}{d\tau} \frac{d\xi^\beta[\sigma]}{d\tau}}, \qquad \text{Eqn. 6}$$

in terms of the a dummy path parameter τ. This distance is invariant under a $$\frac{r(r+1)}{2}$$

parameter group of isometries (see Ref. [Weinberg] for examples):
   rigid rotations of the signatures about the origin in signature space, and
   restricted local translations of the signatures.

Let the SDDs in a corpus be such that their points in the space of equivalence signatures are uniformly distributed. Furthermore, let the distances of those points from the origin fall between $D_{max}$ and $D_{min}$. Then the number of candidate similar SDDs is reduced down from the size of the corpus by a factor of $$\frac{1}{1 + D_{max} - D_{min}}.$$

Similar SDDs lie on the surface of a sphere whose radius is the length of any representative member of the set of similar SDDs.

BACKGROUND OF INVENTION—OBJECTS AND ADVANTAGES

The objects of the current invention include taking, as input, previously computed equivalence signatures for SDDs and using their distances from the origin on the space of equivalence signatures to find all SDDs that are similar to a target SDD The advantages of the current invention include the fact that the computational and resource expense of using feature comparison methods to discover those SDDs that are candidates for similarity to a target SDD is reduced to that required to find those SDDs with signature vector lengths that are equal to that of the target. Furthermore, for said discovery, no one-to-one comparison of the data of SDDs or even projections of their signature vectors is required.

BACKGROUND OF INVENTION—SUMMARY

In accordance with the present invention, a method for determining those sets of digital data (SDD) that are similar to each other finds those SDDs whose distances of their points from the origin in the space of equivalence signatures is the same. The output from this method can be used to significantly reduce the computational expense, time and resources required to find candidates for similar SDDs.

DRAWINGS—FIGURES

In the drawings, closely related figures have the same numerically close numbers.

FIG. 2 is a block diagram of the modules and their interconnections, executed by the processing unit of the computing device in FIG. 1, in determining the similarity of a plurality of SDDs to other SDDs, according to one embodiment.

DETAILED DESCRIPTION—PREFERRED EMBODIMENT—FIGS. 1-2

Figure 1:
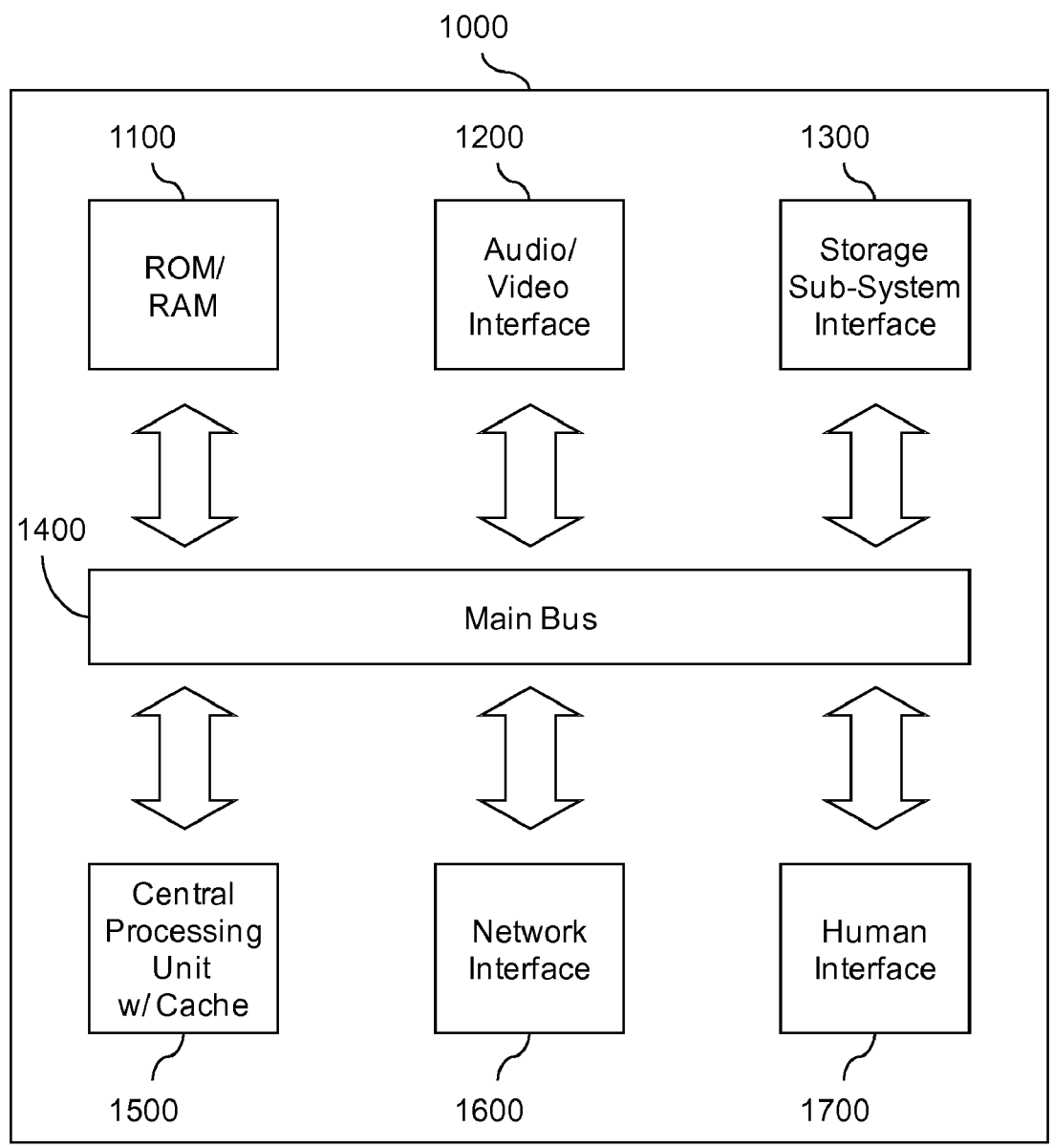
FIG. 1 is a block diagram of a computing device for finding previously analyzed SDDs that are similar to (or separately and alternatively not similar to) the target(s), according to one embodiment.

A preferred embodiment of the method of the present invention is illustrated in FIGS. 1-2.

A SDD is pre-assigned a set of equivalence signatures through previously invented methods [Brooks]. Each equivalence signature is a number. Collectively, the equivalence signatures are input as a linear buffer of these numbers.

SDDs that are candidates for similarity with a target SDD can be identified, in a database, by requiring that the distances of their equivalence signatures from the origin of the space of equivalence signatures be equal to the distances of the target's equivalence signatures from the origin of the space of equivalence signatures.

Operation—Preferred Embodiment—FIGS. 1-2

In FIG. 1, an illustration of a typical computing device 1000 is configured according to the preferred embodiment of the present invention. This diagram is just an example, which should not unduly limit the scope of the claims of this invention. Anyone skilled in the art could recognize many other variations, modifications, and alternatives. Computing device 1000 typically consists of a number of components including Main Memory 1100, zero or more external audio and/or video interfaces 1200, one or more interfaces 1300 to one or more storage devices, a bus 1400, a processing unit 1500, one or more network interfaces 1600, a human interface subsystem 1700 enabling a human operator to interact with the computing device, and the like.

The Main Memory 1100 typically consists of random access memory (RAM) embodied as integrated circuit chips and is used for temporarily storing configuration data, database records and intermediate and final results processed and produced by the instructions implementing the method invented here as well as the instructions implementing the method, the operating system and the functions of other components in the computing device 1000.

Zero or more external audio and/or video interfaces 1200 convert digital and/or analog A/V signals from external A/V sources into digital formats that can be reduced to PCM/YUV values and the like. Video frame YUV values form the SDDs.

Storage sub-system interface 1300 manages the exchange of data between the computing device 1000 and one or more internal and/or one or more external storage devices such as hard drives which function as tangible media for storage of the data processed by the instructions embodying the method of this invention as well as the computer program files containing those instructions, and the instructions of other computer programs directly or indirectly executed by the instructions, embodying the method of this invention.

The bus 1400 embodies a channel over which data is communicated between the components of the computing device 1000.

The processing unit 1500 is typically one or more chips such as a CPU or ASICs, that execute instructions including those instructions embodying the method of this invention.

The network interface 1600 typically consists of one or more wired or wireless hardware devices and software drivers such as NIC cards, 802.11x cards, Bluetooth interfaces and the like, for communication over a network to other computing devices.

The human interface subsystem 1700 typically consists of a graphical input device, a monitor and a keyboard allowing the user to select files that contain SDDs that are to be analyzed by the method.

In FIG. 2, an illustration is given of the modules executing the method of the present invention on the processing unit 1500. First, the Analysis Manager 1550 reads the equivalence signatures of the target SDD from the operating system 1570. Second, the Analysis Manager instructs the Isometric Distance Calculator 1580 to compute the length of the vector of equivalence signatures of the target SDD. Third, the Analysis Manager instructs the Signature Database 1560 to return those records in the database whose keys are such that their most significant halves equal the length of the equivalence signature vector of the target SDD. The Analysis Manager 1550 then reports the contents of said records to the requester and then waits for the next request.

The Isometric Distance Calculator 1580 computes the length of equivalence signature vectors in accordance with Eqn. 5 and Eqn. 6 by looping over the equivalence signatures and summing their squares to form a temporary result which was set to zero prior to the first roll of said loop. At the completion of the last roll of said loop, the square of the temporary result is taken as the result for the length of the equivalence signature vector.

The Signature Database 1560 is pre-populated with one record for each SDD in the corpus. Said record includes fields containing the identifiers, such as URLs to the files containing the SDDs and the like, of the SDD. In a second embodiment, said record also contains other fields populated with the values of the equivalence signatures. In a third embodiment, said record also contains other fields populated with other feature data about the SDD. In a fourth embodiment, said record also contains other fields populated with meta data about the SDD. The most significant half of the key of said record is set to the length of the equivalence vector of the SDD associated with said record. The least significant half of the key of said record is set to the updated count of records in the database with the same length for the equivalence signature vector, as those records are sequentially written into the database.

Operation—Additional Embodiments—FIG. 2

In a second embodiment, the Isometric Distance Calculator 1580 computes the length of equivalence signature vectors in accordance with Eqn. 5 and Eqn. 6 by
1) reading the equivalence signatures the length of whose vector is to be computed,
2) introducing and setting a variable, with name such as LEN, to zero,
3) introducing a variable with name such as DELTALEN2,
4) reading the values of $K_{\alpha\beta}$ and K from the configuration data,
5) looping over the path parameter from the origin to the point with coordinate given by the equivalence signatures of the SDD,
6) setting the value of the variable DELTALEN2 to zero,
7) looping over a loop variable y from y=0 to y=(r−1) incrementing by one at each roll of the loop,
  a) computing the value of the y-coordinate on the space of equivalence signatures at the current path parameter,
  b) computing the value of the y-coordinate on the space of equivalence signatures at the current path parameter plus one,
  c) computing the y-velocity in the y-direction as the result from the latter step minus the result from the latter step
  d) looping over a loop variable x from x=0 to x=(r−1) incrementing by one at each roll of the loop,
    i) computing the value of the x-coordinate on the space of equivalence signatures at the current path parameter,
    ii) computing the value of the x-coordinate on the space of equivalence signatures at the current path parameter plus one,
    iii) computing the x-velocity in the x-direction as the result from the latter step minus the result from the latter step
    iv) computing the value of the xy-component of the metric on the space of equivalence signatures using the value of $K_{\alpha\beta}$ and K from the latter step,
    v) multiplying the results from the latter steps and the latter step and the latter step
    vi) setting the value of the variable DELTALEN2 to the sum of the current value of DELTALEN2 and the result from the latter step,
    vii) rolling the next loop over x,
  e) rolling the next loop over y,
  f) setting the value of the variable LEN to the sum of the current value of LEN and the square root of the value of DELTALEN2,
8) rolling the next loop over the path parameter
9) upon completion of the last roll of the loops over the path parameters, return the value of the variable LEN as the value of the length of the equivalence signature vector.

Conclusion, Ramifications, and Scope

Accordingly, the reader will see that the method invented here significantly reduces the number of SDDs that must be compared to produce a final set of SDDs that are similar to a target SDD. Said reduction finds candidates for similar SDDs by reading those records from the database of SDDs for which the most significant halves of the keys of said records are equal to the length of the equivalence signature vector of the target. Subsequently, more computationally intensive feature comparison techniques such as [U.S. Pat. Nos. 7,031,980; 5,933,823; 5,442,716] can be utilized to produce a final list of similar SDDs from the reduced list produced by this method.

The present invention has been described by a limited number of embodiments. However, anyone skilled in the art

What is claimed is:

1. A computer implemented method of retrieving candidate sets of digital data (SDD) stored in a database comprising:
   a) receiving, into a buffer by a processor, one or more vectors of equivalence signatures of target SDD, each said one or more vectors comprises:
      i) a list of numbers, and
      ii) the number of elements of the vector,
   b) calculating the lengths of said one or more vectors using a isometric distance calculator,
   c) creating a record for each section of each target SDD, said record comprises a key, wherein the most significant half of the key value, is the calculated length of the equivalence signature vector of said target SDD,
   d) eliminating potential candidate SDD by comparing the most significant halves of the keys of the target SDD to those of the stored candidate SDD, and
   e) performing further processing on the remaining candidate SDD in order to return a final list of candidate SDD.

2. The method of claim 1, wherein the step of computing the length of the equivalence signature vector comprises:
   a) introducing a variable LEN and setting it to zero.
   b) looping over the number of equivalence signature in the vector of equivalence signature,
   c) reading an equivalence signature from the buffer of equivalence signatures,
   d) multiplying said equivalence signature by itself to form a temporary result,
   e) forming a sum by adding said temporary result to the value of LEN and replacing the value of LEN with said sum,
   f) rolling the loop to the next equivalence signature, returning to the last step or exiting the loop if it is the last equivalence signature, and
   g) returning the value of the square root of said variable LEN as the length of the equivalence signature.

3. The method of claim 1, wherein the step of computing the length of the equivalence signature vector is proceeded by:
   a) introducing a variable with name such as LEN and setting it to zero,
   b) reading an equivalence signature from the buffer of equivalence signatures,
   c) looping over the path from the origin to the equivalence signature point in the space of equivalence signatures,
   d) at the point on the path in the current roll of said loop,
      i) forming the velocity vector on the space of equivalence signatures as the coordinate at the next point in the loop minus the coordinate at the current point in the loop,
      ii) computing the product of the metric matrix on the space of equivalence signatures with said velocity vector to form a first result,
      iii) then multiplying the transpose of said velocity vector on the space of equivalence signatures and the first result to form a second result, and
      iv) then taking the square root of the second result to form an element length,
   e) setting the value the variable LEN to the sum of the current value of LEN and the value of the last element length computed, and
   f) upon completing of the loops, returning the value of the variable LEN as the length of the equivalence signature.

4. A computer implemented method for retrieving a final list of previously stored candidate sets of digital data (SDD) comprising:
   a) receiving, into a memory by a processor, one or more vectors of equivalence signatures of target SDD, each said one or more vectors comprises:
      i) a list of numbers, and
      ii) the number of elements of the vector
   b) computing the length of the equivalence signature vector using an isometric distance calculator,
   c) storing a record for each of the SDD, if said record is not already present; said record comprises a key, wherein the most significant half of the key, is the computed length of the equivalence signature vector of said target SDD, and
   d) creating a first list of candidate SDD by querying a database for SDD that are potential candidates for similarity with said target SDD by comparing the most significant halves of the keys of the target SDD to those of the stored SDD, and
   e) returning a final smaller list of candidate SDD by using the least significant half of said keys.

5. The method of claim 4, further comprises creating and writing a record, in said database, for each section in each set of the said input sets of digital data, said record comprises,
   a) a key,
      wherein the most significant half of whose value, is the length of the equivalence signature vector of said set of digital data, and
      wherein the least significant half of whose value is the sequential count, starting at zero, of sets of digital data with said equivalence signature and whose equivalence signatures were previously written to the database,
   b) one or more fields including a field storing the value referencing the medium wherein said set of digital data is stored,
   c) one or more fields including secondary feature data, for said set of digital data, and
   d) other fields containing meta data about said set of digital data.

6. The method of claim 4, wherein a storage identifier comprises the location of a file containing a set of digital data along with the starting position of said data set in the file and the length of the data comprising said set.

7. The method of claim 4, further comprises reading a plurality of records and for each of the records extracting the length of the equivalence signature vector of a set of digital data as the most significant half of the key of the record and extracting the fields, comprising secondary features as well as the meta data, including the storage identifier, from the record.

8. The method of claim 4, further comprises retrieving, from said database, a plurality of records for which the most significant half of the values of the keys of the records are equal to a specified length of the equivalence signature vectors of a said target set of digital data.

9. A computer implemented method comprising:
   a) receiving, into a memory by a processor, one or more vectors of equivalence signatures of target sets of digital data, each said one or more vectors comprises:
      i) a list of numbers, and
      ii) the number of elements of the vector,
   b) computing the length of the one or more vectors of equivalence signatures using an isometric distance calculator, c) storing a record for each of the sets of digital data, if said record is not already present in the database;
d) querying the database for sets of digital data that are potential candidates for similarity with said one or more target sets of digital data by specifying the lengths of each one or more vectors of equivalence signatures of the target sets of digital data, and
e) comparing a set of secondary features provided with the target set of digital data against the secondary features of candidate/similar sets of digital data whose records are in said database, and wherein the step of computing the length of the equivalence signature vector is proceeded by:

a) introducing a variable with name such as LEN and setting it to zero,
b) reading an equivalence signature from the buffer of equivalence signatures,
c) looping over the path from the origin to the equivalence signature point in the space of equivalence signatures,
d) at the point on the path in the current roll of said loop,
 i) forming the velocity vector on the space of equivalence signatures as the coordinate at the next point in the loop minus the coordinate at the current point in the loop,
 ii) computing the product of the metric matrix on the space of equivalence signatures with said velocity vector to form a first result,
 iii) then multiplying the transpose of said velocity vector on the space of equivalence signatures and the first result to form a second result, and
 iv) then taking the square root of the second result to form an element length,
e) setting the value the variable LEN to the sum of the current value of LEN and the value of the last element length computed, and
f) upon completing of the loops, returning the value of the variable LEN as the length of the equivalence signature.

10. The method of claim 8, further comprises the comparison, of said set of secondary features provided with said target set of digital data, against the secondary features for said similar sets of digital data found by querying the database and returning the list produced by the comparison of the secondary features as the final list of sections of sets of digital data that are similar to said target set of digital data.

* * * * *